UNITED STATES PATENT OFFICE.

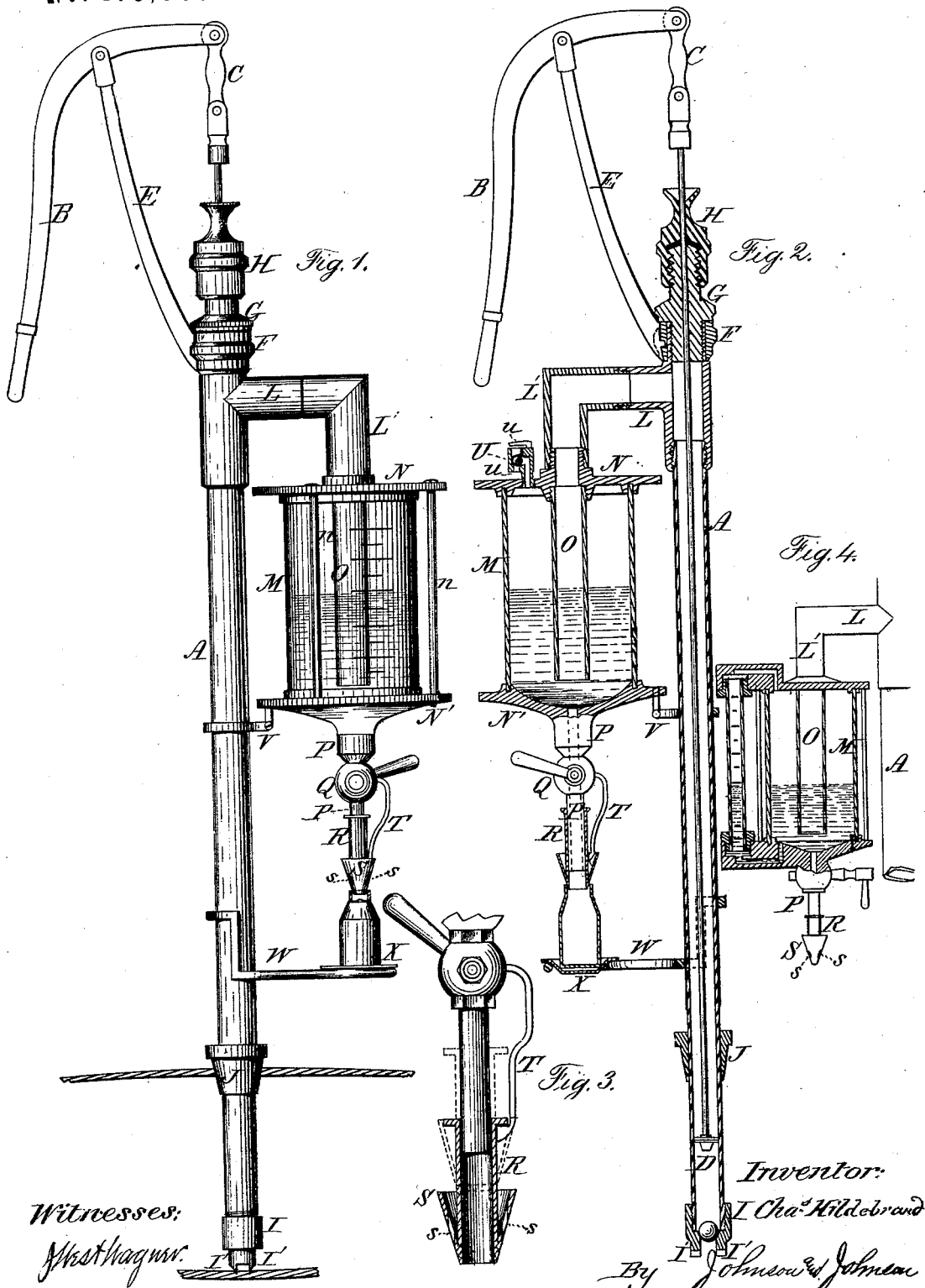

CHARLES HILDEBRAND, OF YOUNGSTOWN, OHIO.

IMPROVEMENT IN MEASURING-PUMPS.

Specification forming part of Letters Patent No. 175,980, dated April 11, 1876; application filed January 24, 1876

*To all whom it may concern:*

Be it known that I, CHARLES HILDEBRAND, of Youngstown, in the county of Mahoning and State of Ohio, have invented a new and useful Improvement in Measuring-Pumps, of which the following is a specification:

The object of this invention is to provide an improved instrument for drawing oils, and various other liquids, from casks and other reservoirs in which such liquids are kept, and for accurately measuring the quantity of the liquid before it is discharged into the can or other vessel destined to receive it; which instrument is to be complete in itself, and capable of application to any cask or other reservoir in which the liquid is contained.

The features of which the invention consists will be fully understood from the following description, reference being had to the accompanying drawings, in which—

Figure 1 represents an elevation of my improved oil-measuring pump; Fig. 2, a vertical section of the same, and Fig. 3 an enlarged detail of the extensible nozzle.

The hollow pump-stock is indicated by A, and B is the pump-handle, to which the piston D is attached by a link or connection, C, and supported by an arm, E, secured rigidly to a ring, F, on the stock. The pump itself is of any ordinary or preferred construction. The ring F is held in place by a thimble, G, which screws directly into the stock within it. Above the thimble G, the upper portion of which is made smaller in diameter, and screw-threaded, as shown, is screwed the top H of the pump-stock. The parts are thus rendered easily detachable for inspection, repairs, or cleaning.

The bottom of the pump-stock, which is preferably made in the form of a detachable section, I, as shown, is provided with short legs I' I', armed at the bottom with sharp projections.

When the pump-stock is inserted into a barrel through a bung-hole, these projections strike the opposite side of the interior of the barrel, and serve to "step" or steady the instrument, while the free ingress of the liquid into the pump is permitted. When the vessel to be drawn from is of metal or other material not admitting the use of the spurs, the section I may be removed.

A sliding thimble, J, on the pump-stock, which thimble has a tapering perimeter, fits into the bung-hole of the barrel, and can be tightened at will to give perfect steadiness to the stock. A rag, or other suitable material, may be used as packing in connection with the thimble. The pump-stock may be made slightly smaller in diameter in its lower portion, so as to permit the thimble to slide freely thereon, and prevent its ascending above a certain point.

The sharp points on the legs I' I' would not alone be sufficient to steady the instrument, but the co-operation of the tapering thimble, fitting accurately upon the stock, enables the operator to adjust the instrument to any size of bung, and different-sized barrels, and secure perfect steadiness at both points. The spout of the pump is preferably made in two sections, L L', the latter detachable, and bent downwardly in elbow form, as shown. This spout carries a measuring-receiver, M, the heads N N' of which are preferably made of metal, and secured together by screw-threaded tension rods $n\ n$. The cylinder of this receiver is made of glass or metal, with a graduated scale marked thereon, for the purpose of indicating the quantity of liquid contained at any time within the vessel. Within the vessel a tube, O, a continuation of the spout L', descends within a short distance from the bottom of the receiver, to prevent the foaming of the oil as it runs into the receiver, and the consequent obscuration of the scale. The lower head N' of the receiver is perforated; and a discharging-tube, P, provided with a stop-cock, Q, kept closed while the vessel is filling, conducts the oil or other liquid from the receiver into the bottle, can, or other receptacle beneath.

On the lower end of the tube P is a telescopic extension-tube, R, provided at its lower end with a funnel-like collar or flange, S, which is inserted into the neck of the can or bottle to be filled. Two or more small perforations, $s\ s$, permit the escape of air from the bottle or can while filling. This tube slides up and down on the tube P for the purpose of adjustment, and is retained at any desired height by the spring T, the free lower end of which bears against the tube R.

A double-acting ball-valve, U, on the upper head N of the measuring-receiver M, which valve-seat has apertures $u\ u$ at the top and bottom, permits the escape of air while the receiver is filling, and its ingress when the liquid is running out. The lower end of the receiver is connected with the pump-stock by means of a clamp-collar, V, secured by a setscrew, or by any other suitable means permitting the receiver to be detached. A detachable bracket, W, is carried by the pump-stock, and can be adjusted up and down thereon, and supports a dripping-pan, X, on which the vessel to receive the oil is set.

The advantages of the invention, briefly stated, are, that it furnishes a complete pump and measuring-instrument combined, which is capable of use in connection with any receptacle for oil or other liquids, particularly kegs or barrels, and thus obviates the inconveniences attending the use of an expensive reservoir, heretofore used in permanent connection with the pump and measure. The receiver can be made of metal, and a glass measuring-tube combined therewith, and attached by arms, as shown in Fig. 4, there being communication for the fluid in the lower arm, and in the upper arm for the air. The tube has stuffing-boxes, and the oil rises in it to the same height as in the receiver.

I claim—

1. The pump-stock A, having the spout L L', to which is secured the measuring-receiver M, said pump stock being provided with means for attaching it to and detaching it from the vessel containing the liquid to be withdrawn, substantially as set forth.

2. The combination, with the measuring-receiver M and discharge-spout L', of the tube O, extending downwardly from the spout nearly to the bottom of the receiver, substantially as and for the purpose set forth.

3. The combination, with the discharge-spout L', receiver M, and discharge-tube P, of the double-acting valve U, substantially as and for the purpose set forth.

4. The combination of discharging-tube P, extension-tube R, and spring T, substantially as and for the purpose set forth.

5. The perforated extensible-tube R S, in combination with the adjustable bracket W, whereby both the discharge-nozzle and the vessel to receive the liquid are rendered adjustable in relation to each other.

In testimony that I claim the foregoing I have affixed my signature in the presence of two witnesses.

CHARLES HILDEBRAND.

Witnesses:
   GEO. GASSER,
   CHARLES SALORO.